United States Patent Office 2,896,527
Patented July 28, 1959

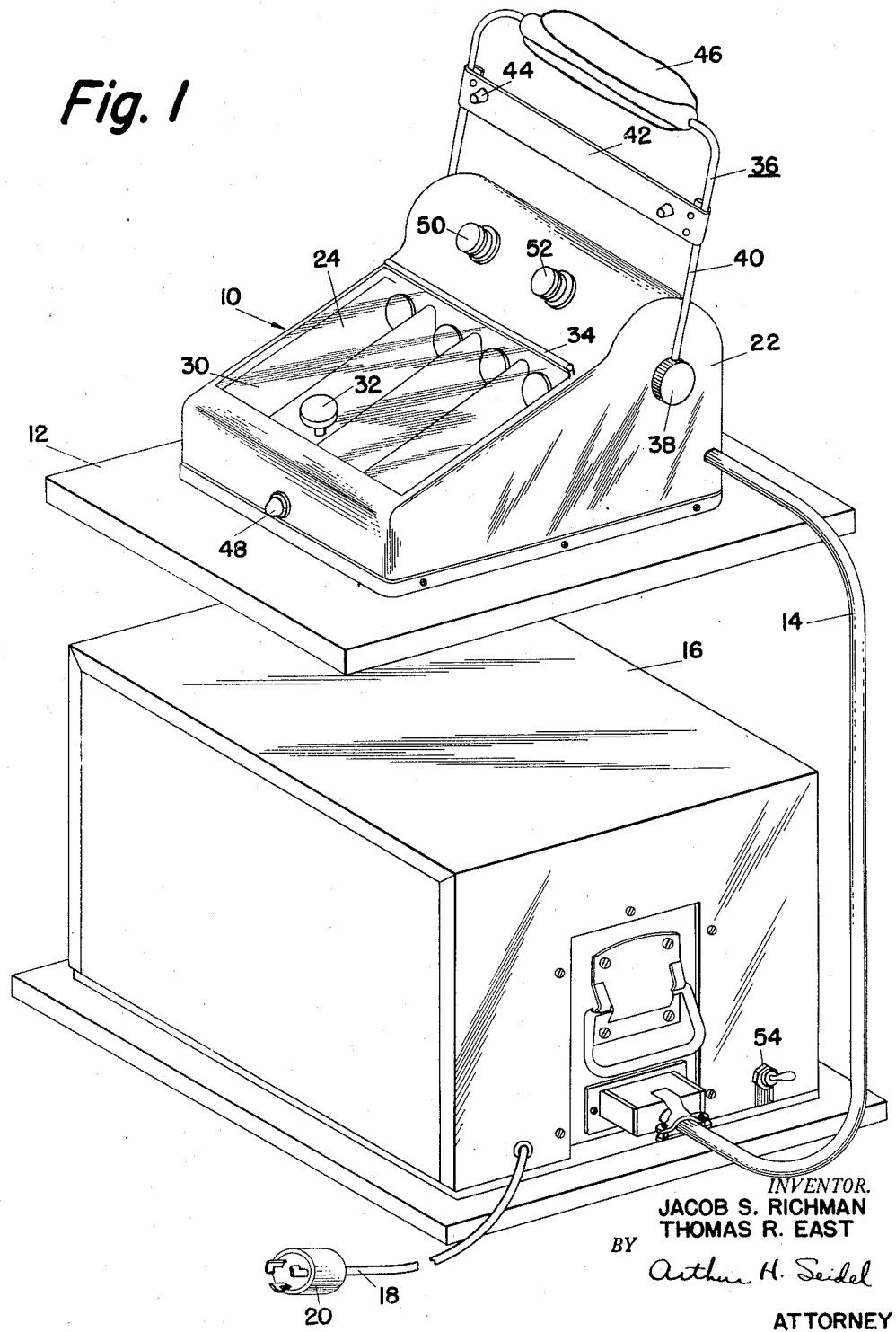

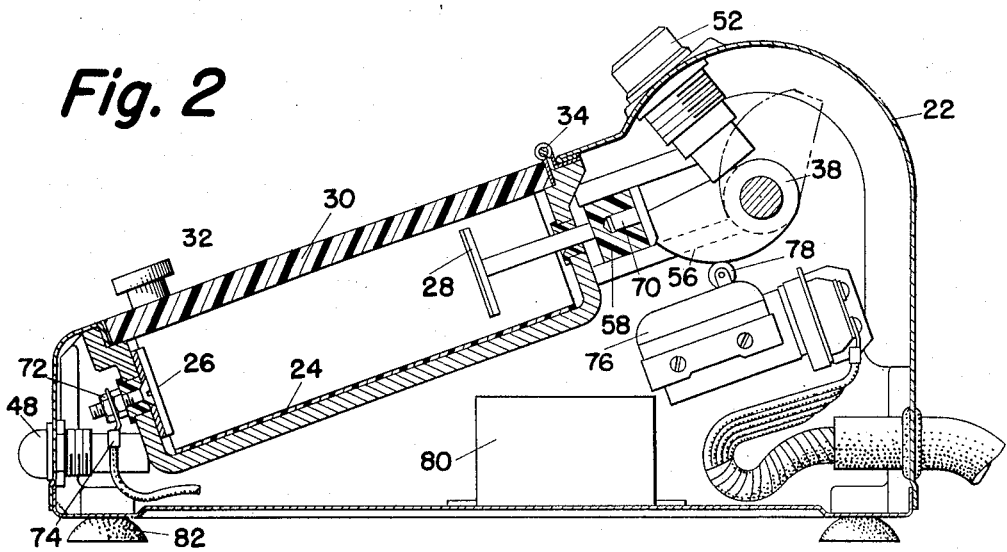
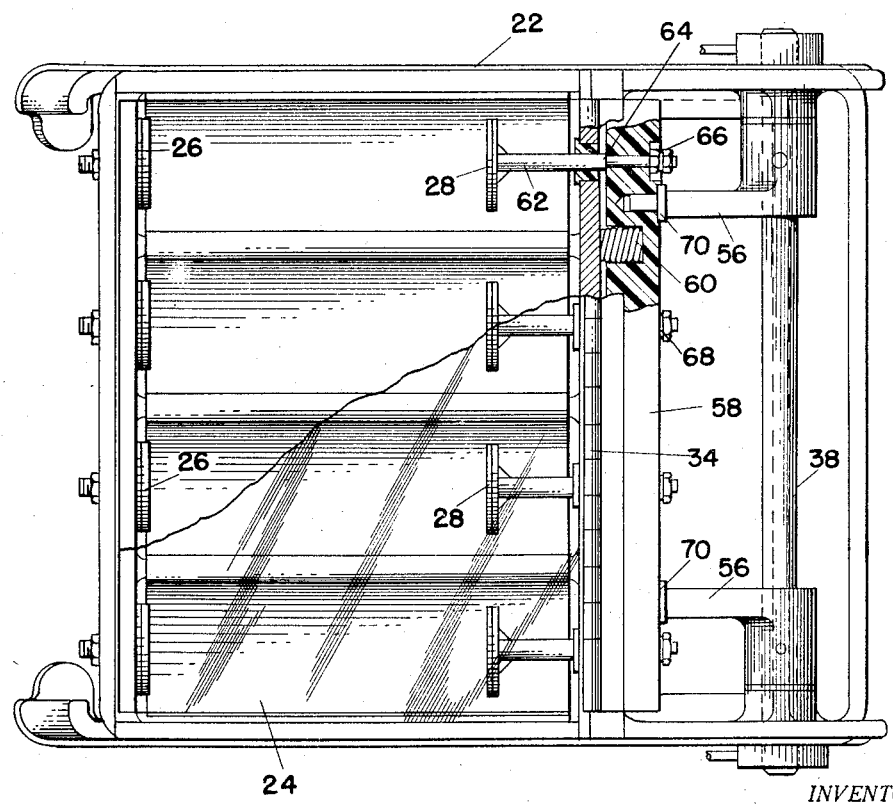

2,896,527

FRANKFURTER COOKING MECHANISM

Jacob S. Richman and Thomas R. East, Philadelphia, Pa.; said East assignor to said Richman Application December 26, 1956, Serial No. 630,588

8 Claims. (Cl. 99—332)

The present invention relates to a frankfurter cooking mechanism and more particularly to a compact apparatus capable of rapidly cooking one or more packaged frankfurters.

The rapid and facile cooking of frankfurters in small eating establishments has long presented a problem. Thus, conventional cooking techniques wherein the frankfurters are placed on spits or mounted on rollers or the like, above a gas flame, are objectionable for a number of reasons. Such techniques require the continuous application of heat to a large number of frankfurters, with the frankfurters being maintained at an elevated temperature for protracted time periods. This form of cooking frequently adversely affects the taste and/or nutritional properties of the frankfurter. Moreover, such techniques are unsightly, and the display of frankfurters exuding juices while being cooked is prone to deter potential customers from ordering the frankfurters.

This invention has as an object the provision of a frankfurter cooking mechanism in which one or more frankfurters may be rapidly cooked.

This invention has as another object the provision of a mechanism for rapidly raising the temperature of one or more frankfurters from a refrigerated condition to a temperature of 160° F. or more.

This invention has as yet another object the provision of a frankfurter cooking mechanism for cooking a frankfurter while the same is disposed within a sealed package and carried within a roll.

The present invention has as a still further object the provision of a frankfurter cooking mechanism employing electrical energy which is of foolproof construction, and comprises safety means insuring the operator against accident.

Other objects will appear hereinafter.

For the purpose of illustrating the invention there is shown in the drawings a form which is presently preferred; it being understood, however, that this invention is not limited to the precise arrangements and instrumentalities shown.

Referring to the drawings wherein like reference characters refer to like parts:

Figure 1 is a perspective view of the cooking mechanism of the present invention in the form of a counter model disposed upon the counter or a table of the location where used, with its power supply disposed therebeneath.

Figure 2 is a side sectional view through the counter model.

Figure 3 is a plan view of the counter model, with parts broken away to reveal the construction thereof.

Figure 4:
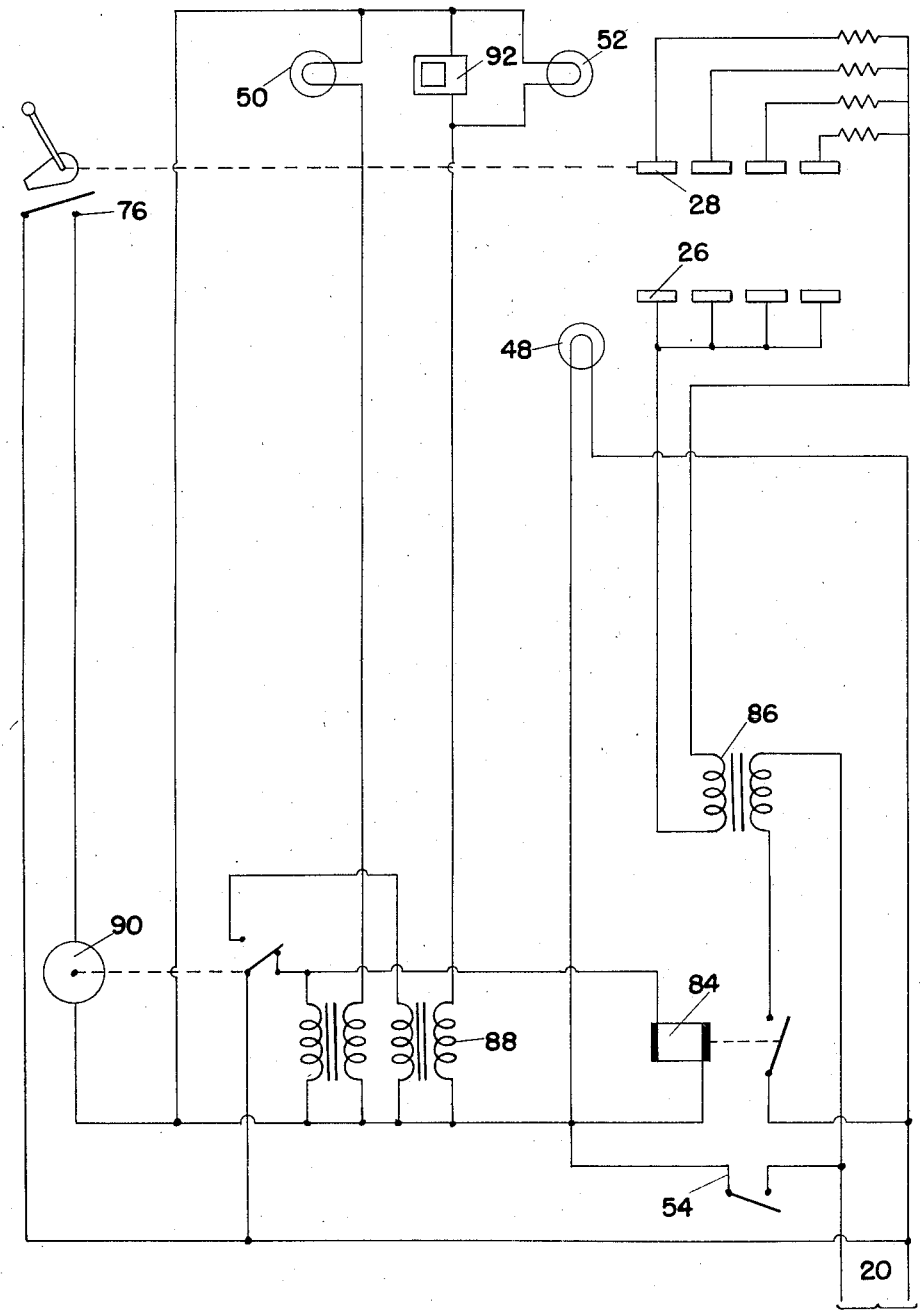
Figure 4 is a diagrammatic view of the electrical means employed in the counter model and its power supply.

Referring to the drawings, and initially to Figure 1 the cooking mechanism of the present invention is designated generally as 10. Cooking mechanism 10, which may be supported upon an exposed counter, table or shelf 12 is connected by multiconductor electrical line 14 to its power supply 16, which may be mounted therebeneath. In other embodiments of the present invention, the power supply 16 and the cooking mechanism 10 may be jointly disposed within a single housing, and may constitute a unitary cabinet having facilities for storage and refrigeration of frankfurters, or frankfurter-bun package units, etc.

The power supply 16 is connected to a source of electric current by means of electric cord 18 and plug 20.

The cooking mechanism 10 comprises a housing 22 formed of sheet metal, or the like. Upon the upper surface of the housing 22 are disposed a plurality of wells 24. In the illustrated embodiment, four wells 24 are shown, but it is to be understood that a larger or smaller number of such wells may be utilized.

Each of the wells 24 is identical to the remaining wells and comprises a semicircular trough tilted in respect to the vertical. A fixed basal electrode 26 is provided at the lowermost end of each of the wells 24, generally normal to the floor of its well.

A movable electrode 28 is provided in the upper portion of each of wells 24, generally normal to the floor of its well 24, and generally juxtaposed to the basal electrode 26 of its well 24.

A transparent cover 30 formed of methyl methacrylate, or like plastic, provided with a knob 32 is pivotally hinged by means of hinge 34 to the upper surface of housing 22. When cover 30 is disposed in its closed position, covering the wells 24, access to the wells 24 is entirely prevented.

A lever and handle assembly designated generally as 36 may be pivoted about shaft 38 onto or away from transparent cover 30. The lever and handle assembly 36 includes a U-shaped lever 40 having a flat web 42 connecting the legs thereof intermediate the ends of the legs of the lever 40 connected to shaft 38 and the bight of lever 40. A pair of resilient bumpers 44 formed of soft rubber or the like may be provided upon the undersurface of web 42. A handle grip 46 may be provided on the bight of lever 40.

The cooking mechanism 10 may be provided with a plurality of lights, as for example, a yellow-colored pilot light 48, a red-colored cooking light 50 and a green-colored ready light 52. The power supply 16 is provided with a toggle switch 54, the closing of which is indicated by the illumination of yellow pilot light 48.

The shaft 38 is provided with a pair of spaced cams 56, which are splined or otherwise secured, and which rotate upon the rotation of shaft 38. The cams 56 engage bar 58 when lever 40 is disposed upon cover 30. The bar 58 is spring-urged by means of spring means 60 towards cams 56.

The movable electrodes 28 each comprise a piston shaped element, the piston rod portion 62 of which extends into the bar 58, the piston rod portion 62 being of reduced diameter when retained within bar 58 so that the shoulder 64 thereon engages the inner face of bar 58 and prevents the backward movement of the electrode 28 in respect to the bar 58. The outermost end of the piston rod portion 62 of each electrode 28 is threaded, and nuts 66 are mounted thereon to provide for connection to a suitable electrical lead 68.

The bar 58 is preferably formed of a non-conducting plastic having good strength and durability characteristics. A suitable material for this purpose is the so-called Micarta plastic. Studs 70 may be provided on the outer face of bar 58 to act as buffer plates and to engage cams 56.

Similarly, each of the wells 24 may be formed of non-conducting plastic, with the floor of the wells lined with a layer of metal or other material (not connected with the electrodes) for resistance to wear and appearance characteristics. The electrical connection to each of the electrodes 26 may be accomplished by nuts 72 and a suitable electrical lead 74.

A microswitch 76 provided with a cam follower 78 is positioned beneath one of the cams 56, with the cam follower 78 controlling the breaking and making of the microswitch 76. Thus, when the cam 56 is disposed as in Figure 2, in which position it urges the bar 58 and the electrodes 28 inwardly to their innermost disposition, the microswitch 76 is closed permitting current to be passed from line 14 to the electrodes 28. When the shaft 38 is rotated to the position shown in phantom in Figure 2 (upon the upward movement of lever 40) the cam follower 78 of microswitch 76 becomes disengaged from its associated cam 56 opening the microswitch 76 and terminating the flow of current to the electrodes 28. A buzzer 80 is disposed within housing 22 to provide an audible signal, as will be more fully explained below.

Preferably, the housing 22 is carried on counter 12 by means of resilient suction cups 82.

The operation of the cooking mechanism and power supply of the present invention will be described jointly with the description of the electrical components of the present invention and their operation:

The frankfurter cooking mechanism of the present invention may be used to cook frankfurters, per se, preferably with the ends of the frankfurters trimmed in order to remove the derma or thickened outer portion of the frankfurter at the ends of the frankfurter, so as to expose the pulp of the frankfurter at its ends. However, the frankfurter cooking mechanism of the present invention is primarily intended for a frankfurter package unit, such as the frankfurter package unit which forms the subject matter of copending United States patent application Serial No. 582,148, filed May 2, 1956 in the name of Jacob S. Richman, entitled Frankfurter Package Unit and Process for Cooking Frankfurters. This frankfurter package unit comprises a frankfurter disposed within an open-ended bun of substantially the same length as the frankfurter, with a wrapper confinedly embracing the frankfurter and bun. The wrapper includes sealed ends formed of a metallic conductor, such as aluminum foil, which sealed ends are separated by an intermediate wrapper portion formed of a flexible transparent plastic. As above-indicated, the frankfurter has its ends trimmed whereby the pulp portion of the frankfurter is exposed at the ends, with the trimmed ends of the frankfurter being juxtaposed to the sealed metallic conductor ends of the wrapper.

Frankfurter package units of the aforesaid type may be stored within a refrigerator, and then removed and placed within one of the wells 24. In the illustrated embodiment, up to and including four such frankfurter package units may be placed within the wells 24. In order to obtain access to the wells 24, it is necessary to lift cover 30 by knob 32. In order to lift cover 30, the lever and handle assembly 36 must be raised, as to the position shown in Figure 1. In this raised position the shaft 38 is rotated so that the cams 56 are in the position shown in phantom in Figure 2, so that the microswitch 76 is not engaged with the adjacent cam 56. In this position microswitch 76 is open, and current cannot flow between the electrodes 26 and 28 even though switch 54 is closed and pilot light 48 is lit.

When the frankfurter package units are positioned within the wells 24, the cover 30 is closed, and the lever and handle assembly 36 is lowered. The lowering of lever and handle assembly 36 effects rotation of shaft 38 bringing the cams 56 to the position shown in Figure 2. In this position the electrodes 28 are urged towards the electrodes 26, somewhat compressing the frankfurter within the frankfurter package unit therebetween. Simultaneously the cam follower 78 of microswitch 76 engages its associated cam 56 closing microswitch 76 and allowing current to flow between electrodes 26 and 28 through the conducting ends of the frankfurter package unit and through the frankfurter.

The flow of current may be controlled in the following manner:

The closing of microswitch 76 closes relay 84 which energizes power transformer 86 supplying current for the electrodes 26 and 28. Simultaneously, current is supplied from step down transformer 88 to the cooking light 50 indicating that current is flowing through the electrodes 26 and 28. Also, current is passed to timer 90 of conventional construction, which may be preset for a given time interval. As will be seen from Figure 4, the timer 90 is connected to relay 84 and thus serves as a shut-off control. Thus, at the completion of the preset cooking cycle, the timer shuts off the flow of current to the electrodes and simultaneously passes current to buzzer 92 which sounds an audible signal and to ready light 52 which gives a visual signal of the completion of the cooking cycle.

The present invention may be embodied in other specific forms without departing from the spirit or essential attributes thereof and, accordingly, reference should be made to the appended claims, rather than to the foregoing specification as indicating the scope of the invention.

We claim:

1. A cooker for frankfurters comprising at least one frankfurter-receiving well, a pair of juxtaposed electrodes disposed at opposite ends of said well, one of said electrodes being movable in a path towards and away from the other of said electrodes, cover means for said well, said cover means comprising a movable cover and an independently movable lever, said cover being movable between a position in which access to the well may be had and a position preventing access to the well, said lever being movable between a position superposed above said cover when said cover is disposed in its second-mentioned position and a position away from said cover when said cover is disposed in its second-mentioned position, means connected to said lever for urging the movable electrode towards the other of said electrodes when said lever is disposed in its first-mentioned position, means for urging the movable electrode away from the other of said electrodes when said lever is disposed in its second-mentioned position, and a switch connected to said lever and constructed and arranged to interrupt the flow of current between said electrodes when said lever is disposed in its second-mentioned position and to permit the flow of current intermediate said electrodes when said lever is disposed in its first-mentioned position.

2. A cooker for frankfurters comprising at least one frankfurter-receiving well, a pair of juxtaposed electrodes disposed at opposite ends of said well, one of said electrodes being movable in a path towards and away from the other of said electrodes, a timer connected to said electrodes for terminating the flow of current intermediate said electrodes after a predetermined time interval, cover means for said well, said cover means comprising a movable cover and an independently movable lever, said cover being movable between a position in which access to the well may be had and a position preventing access to the well, said lever being movable between a position superposed above said cover when said cover is disposed in its second-mentioned position and a position away from said cover when said cover is disposed in its second-mentioned position, means connected to said lever for urging the movable electrode towards the other of said electrodes when said lever is disposed in its first-mentioned position, means for urging the movable electrode from the other of said electrodes when said lever is disposed in its second-mentioned position, and a switch connected to said lever and constructed and arranged to interrupt the flow of current between said electrodes when said lever is disposed in its second-mentioned position and to permit the flow of current intermediate said electrodes when said lever is disposed in its first-mentioned position.

3. A cooker for frankfurters comprising a plurality of frankfurter-receiving wells, a pair of juxtaposed electrodes disposed at opposite ends in each of said wells, one of said electrodes being movable in a path towards and away from the other of said electrodes in each of said wells, said movable electrodes being electrically connected together and joined together by a common bar, the other of said electrodes in each of said wells being stationary, each of said stationary electrodes being electrically connected together, a transparent cover for said wells, said cover being pivotable between a position in which access to the wells may be had and a position preventing access to the wells, an independently pivotable lever, said lever being pivotable between a position superposed above said cover when said cover is disposed in its second-mentioned position and a position away from said cover when said cover is disposed in its second-mentioned position, cam means engaged with said lever for moving said bar in the direction of the stationary electrodes when said lever is pivoted towards its first-mentioned position, resilient means for urging said bar away from said stationary electrodes, and a switch positioned adjacent said cam means, said switch being constructed and arranged to interrupt the flow of current intermediate said electrodes when said switch is engaged with said cam means.

4. A cooker in accordance with claim 3 having a timer connected to the electrodes for terminating the flow of current intermediate the electrodes after a predetermined time interval, and signal means connected to the electrodes for signalling the flow of current therebetween.

5. A cooker for frankfurters comprising at least one frankfurter-receiving well, a pair of spaced electrodes disposed within said well, one of said electrodes being movable in a path towards and away from the other of said electrodes, cover means for said well, said cover means comprising a pivotable cover, pivotable means pivoted about a different pivot point than said cover, said pivotable means superposing said cover when said cover is superposed above said well, a switch operatively engaged with said pivotable means when said pivotable means is superposed above said cover, means for urging the movable electrode towards the other of said electrodes when the pivotable means superposes said cover, and means for urging the movable electrode away from the other of said electrodes when the pivotable means is pivoted away from said cover.

6. A cooker for frankfurters in accordance with claim 5 comprising a timer connected to said electrodes for terminating the flow of current intermediate said electrodes after a pre-determined time interval.

7. A cooker for frankfurters in accordance with claim 6 which comprises signal means connected to the electrodes for indicating the flow of current therebetween.

8. A cooker for frankfurters comprising at least one frankfurter-receiving trough-shaped well, a pair of spaced juxtaposed electrodes disposed within said well, cover means for said well, said cover means comprising a movable cover and an independently movable lever, said cover being movable between a position in which access to the well may be had and a position preventing access to the well, said lever being movable between a position superposed above said cover when said cover is disposed in its second-mentioned position and a position away from said cover when said cover is disposed in its second-mentioned position, and a switch adjacent to said lever and operatively engaged with said lever when said lever is disposed in its first-mentioned position and constructed and arranged to interrupt the flow of current between said electrodes when said lever is disposed in its second-mentioned position and to permit the flow of current intermediate said electrodes when said lever is disposed in its first-mentioned position and is operatively engaged with the switch.

References Cited in the file of this patent

UNITED STATES PATENTS

| 1,370,656 | Levin | Mar. 8, 1921 |
| 1,404,852 | Harvey | Jan. 31, 1922 |
| 1,721,493 | Sachs | July 16, 1929 |
| 2,075,474 | Scutt | Mar. 30, 1937 |
| 2,274,325 | Ford | Feb. 24, 1942 |